No. 656,964. Patented Aug. 28, 1900.
E. GOBBE.
KILN, BLAST FURNACE, &c.
(Application filed Dec. 27, 1899.)
(No Model.) 5 Sheets—Sheet 1.

Witnesses Inventor

No. 656,964. Patented Aug. 28, 1900.
E. GOBBE.
KILN, BLAST FURNACE, &c.
(Application filed Dec. 27, 1899.)

(No Model.) 5 Sheets—Sheet 2.

No. 656,964. Patented Aug. 28, 1900.
E. GOBBE.
KILN, BLAST FURNACE, &c.
(Application filed Dec. 27, 1899.)
(No Model.) 5 Sheets—Sheet 3.
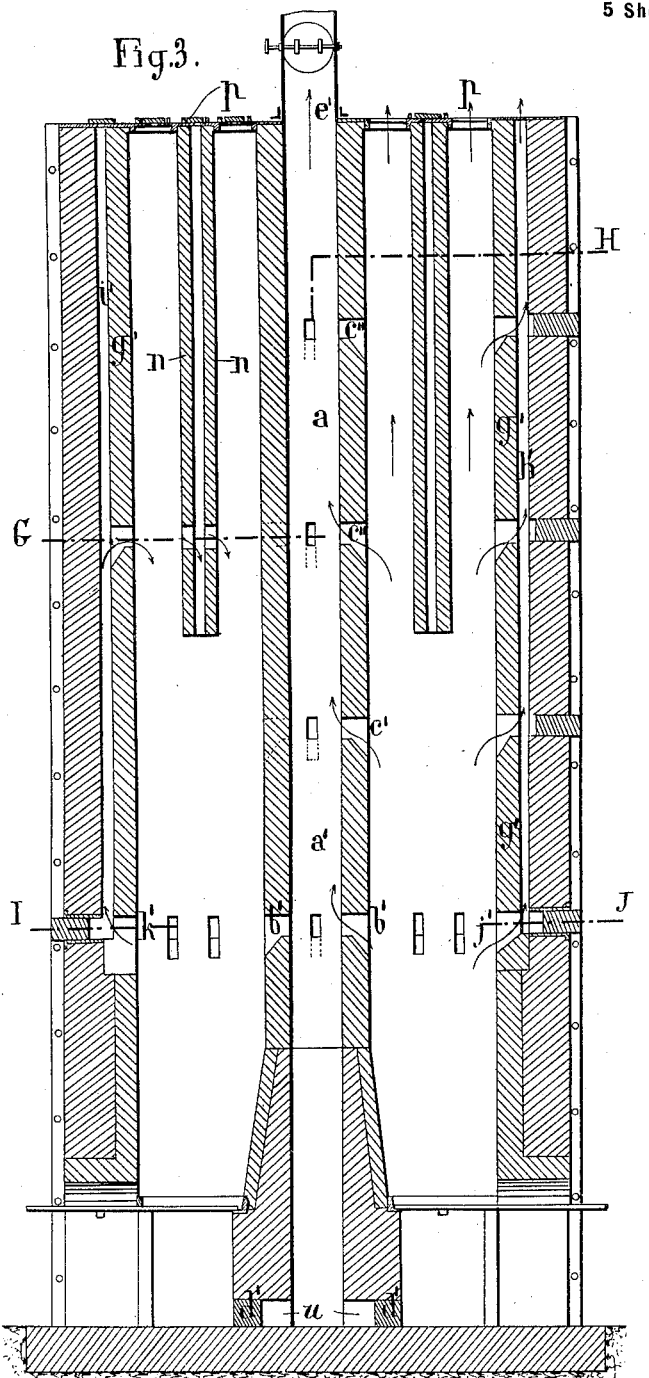
Fig.3.
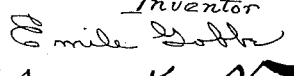

No. 656,964. Patented Aug. 28, 1900.
E. GOBBE.
KILN, BLAST FURNACE, &c.
(Application filed Dec. 27, 1899.)
(No Model.) 5 Sheets—Sheet 4.

Witnesses

Inventor
Emile Gobbe
By James L. Norris
atty

No. 656,964. Patented Aug. 28, 1900.
E. GOBBE.
KILN, BLAST FURNACE, &c.
(Application filed Dec. 27, 1899.)

(No Model.) 5 Sheets—Sheet 5.

UNITED STATES PATENT OFFICE.

EMILE GOBBE, OF JUMET, BELGIUM.

KILN, BLAST-FURNACE, &c.

SPECIFICATION forming part of Letters Patent No. 656,964, dated August 28, 1900.

Application filed December 27, 1899. Serial No. 741,748. (No model.)

*To all whom it may concern:*

Be it known that I, EMILE GOBBE, civil engineer, a citizen of Belgium, residing at Jumet, Belgium, have invented certain new and useful Improvements in Kilns, Blast-Furnaces, Melting-Furnaces, and the Like, of which the following is a specification.

In lime and cement kilns, blast-furnaces, melting-furnaces, and various kinds of furnaces in which the materials to be heated are mixed with the fuel the heat is utilized very inefficiently because the principal part of the carbon monoxid, which is abundantly generated in such furnaces, is not burned. In such furnaces and kilns there is ordinarily a large production of carbon monoxid due to imperfect combustion of the fuel throughout the height of the furnace. There is consequently a simultaneous loss of heat and of fuel. Now in practice only a small portion of this carbon monoxid is burned in the furnace before escaping, so that the loss of heat resulting from its formation is not compensated for.

The object of my invention is to compensate for this loss of heat and to provide means by which the carbon monoxid is completely burned or transformed into carbon dioxid with generation of heat.

In order that my invention may be fully understood, I will describe the same with reference to the accompanying drawings, in which—

Figure 1:
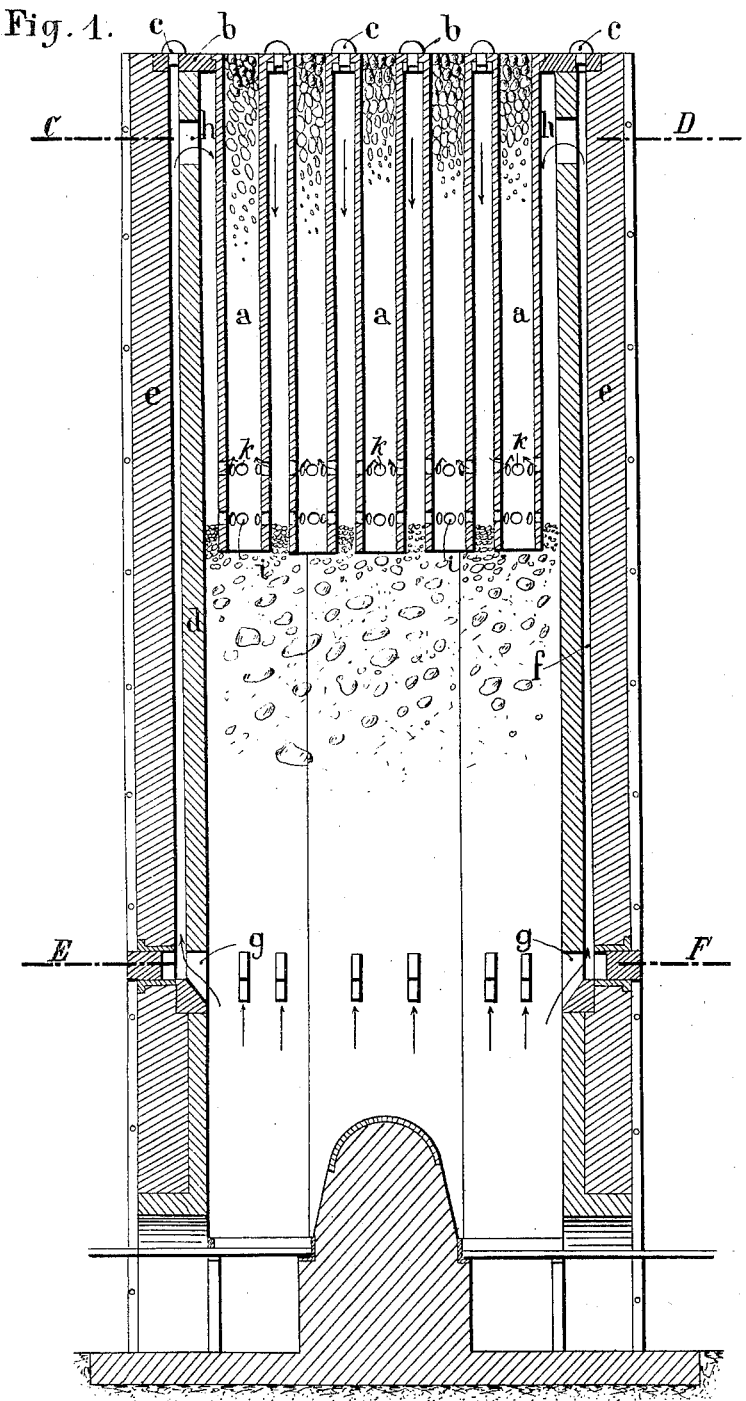
Figure 2:
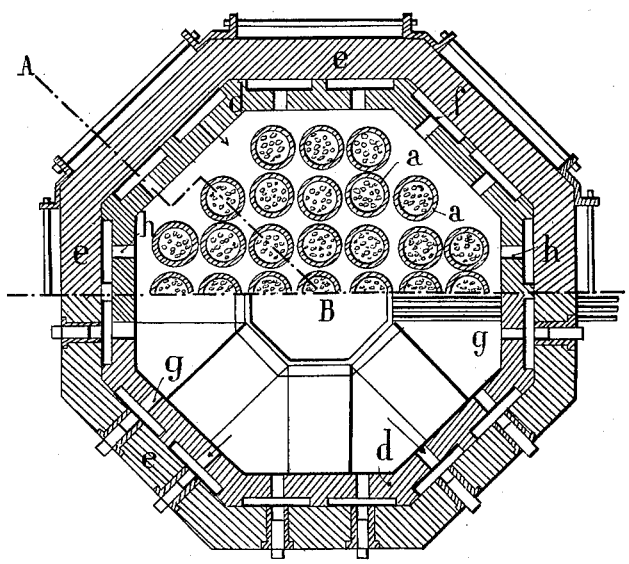
Figure 4:
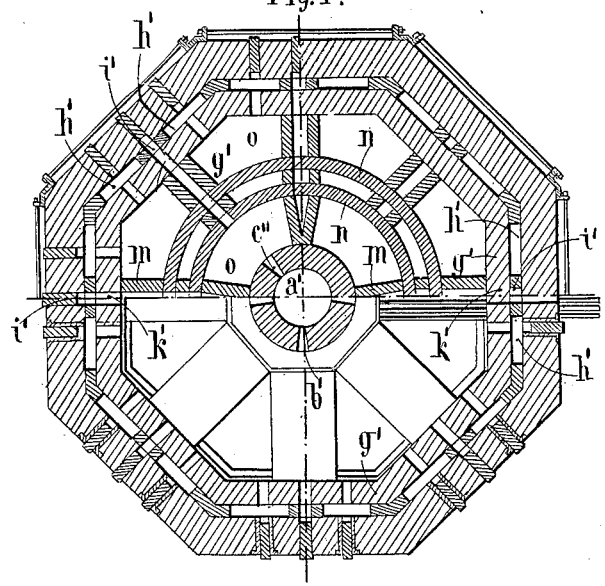
Figure 5:
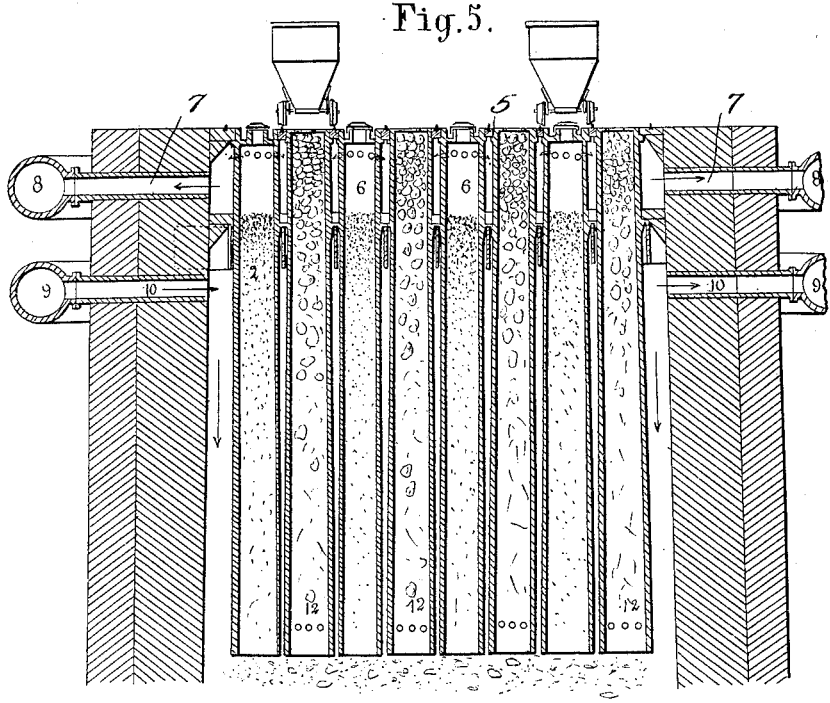

Figure 1 is a vertical section of a lime or cement kiln constructed according to my invention, the section being taken on the line A B of Fig. 2. Fig. 2 shows a horizontal section of the same made through lines C D and E F in Fig. 1. Fig. 3 is a vertical section of a similar furnace in which the pipes for containing the materials to be burned are replaced by brick walls. Fig. 4 shows two half-sections of the same, respectively, through lines G H and I J of Fig. 3. Fig. 5 is a part vertical section showing my invention applied to a blast-furnace.

Taking a limekiln or cement-kiln, for example, according to my invention I suspend in the upper part thereof vertical tubes $a$, having a sufficient diameter to enable the largest portions of the material to be burned to pass through. The said tubes are supported by collars resting upon a frame $b$ at the top of the kiln, so that the tubes can be easily removed and replaced without interfering with the action of the kiln. The said frame $b$ is provided between the tube-openings with a series of smaller openings closed by plugs $c$, through which openings the fuel is introduced.

Between the refractory lining $d$ of the kiln and the outer masonry $e$ I provide vertical flues $f$, through which passes the air, which is slightly heated, in contact with the almost cold charge at the lower part of the kiln. This air enters the said vertical flues $f$ by openings $g$ at a small distance above the grate and then passes up the said flues and out by orifices $h$ at top and enters the space between the aforesaid tubes $a$ and comes into contact with them throughout their length, the object being to prevent the said tubes from being injured by the high temperature. The said air then enters the interior of the tubes by holes $i$ and $k$ at their lower ends and burns the carbon monoxid which rises in the tubes in contact with the material to be burned. The products of combustion escape from the tops of the tubes $a$ reduced in temperature for the reason that they have left a greater part of their heat by coming in contact with the fresh and cold materials contained in the tubes. Consequently there is no loss of heat, as the latter is employed for preparing the new materials for the operation of burning.

The operation of the kiln thus constructed is as follows: The kiln is lighted, which may be done in the ordinary manner by igniting fuel placed on the grate. Then the material to be heated and fuel are introduced alternatively until the lower ends of the tubes $a$ are reached. When the fire has reached this height, the material to be burned (but without fuel) is introduced into the tubes $a$, while from time to time disintegrated carbon is introduced through the openings that are closed by the plugs $c$. The air enters by the grate of the furnace and is heated by its contact with the burned material of the charge, which at first is somewhat cooled, but subsequently recovers the greater part of its heat. A portion of this heated air rises vertically in the interior of the kiln and burns the carbon mixed with the charge below the tubes by developing the high temperature required for the burning and producing carbon monoxid, which rises in the charge in the tubes $a$ because the gas has no other outlet. The other part of the air drawn in through the grate passes through openings $g$ into the vertical flues $f$ and leaves by the orifices $h$, between the tubes $a$, with which it comes into contact throughout their length, the object being to avoid the intense heating of the tubes. It then passes through the holes $i\,k$ in the tubes $a$ and burns the carbon monoxid which rises in the tubes, so that it is entirely burned in these tubes before it can escape at the furnace-top. As the charge in these tubes does not contain fuel, the carbon dioxid formed by the combustion of the carbon monoxid is not decomposed, and the heat produced is absorbed by the charge contained in the tubes. The products of combustion thus escape from the kiln entirely cooled and completely deprived of carbon monoxid. The whole heating power of the fuel is therefore utilized in the kiln.

I may replace the metallic tubes by walls of masonry, as shown in Figs. 3 and 4. In this case the lower part of the kiln remains the same, but comprises a central socket in which a flue $a'$ is constructed which communicates with the interior of the kiln by a series of openings $b'\,c'\,c''$. This flue descends to the bottom of the kiln, so as to admit of its being cleared after removing plugs $d'$ from openings $u$ below the grate, and it communicates above the kiln with an exit-flue $e'$, say, of sheet metal, provided with a plug or valve. The first openings $b'$ of this flue draw in especially air from the charge resting upon the grate, so as to accelerate the cooling thereof, whereas the orifices $c'$ and $c''$ above allow a small portion of the products of combustion to pass, whereby the draft of the kiln is enhanced without loss of heat, seeing that this flue is heated and yields up its heat to the charge surrounding it, so as to prepare the charge for the burning process.

Between the refractory jacket $g'$ and the ordinary brick masonry I provide a series of vertical flues $h'\,i'$, communicating by orifices $j'$ and $k'$ with the interior of the kiln. These flues $h'$ serve for the same purpose as the central flue $a'$ by drawing in the air through the lower openings from the charge placed on the grate, so as to accelerate the cooling thereof, while the upper openings serve for increasing the draft.

Toward the middle of its height the kiln is divided into inner and outer compartments $o$, formed by hollow radial and annular vertical partitions $m\,n$. The flues $h'$ communicate with the outer compartments $o$ and the flues $i'$ with the inner compartments $o$. (See Fig. 4.) The flues $i'$ are intended to convey the gases to the inner compartment $o$ and must be closed for that reason. The twelve compartments formed by these partitions receive the material to be burned, but without fuel, whereas the spaces of the hollow partitions receive the fuel supplied in small quantities through openings at the top of the kiln. Dampers (which may be formed by small plates $p$ of cast-iron or ceramic slabs) control the feed-openings for fuel, so that they may be opened more or less according to the working of the kiln. Similarly the draft in the other vertical compartments may be regulated by the aid of an appropriate device.

The advantages which this invention presents are very numerous. The cost of the installation is comparatively small, as the tubes can be applied to any kind of kiln-furnace by simply modifying the inner refractory jacket. It effects a considerable saving of fuel (fifty per cent. of the weight) due principally to the complete combustion of the carbon monoxid and to the heat recovered by the air serving for the combustion of this gas, because this air absorbs the heat and its heating is completed in contact with the metal tubes, while at the same time the heat derived from the products of combustion which rise in the interior of these tubes is utilized. It is likewise very easy to obtain a good distribution of the fire, as it is possible to pass the heat at will through the flues as required by closing them more less. The auxiliary air serving for the combustion of the carbon monoxid enhances the cooling of the charge placed on the grates, so that it leaves the kiln cooler, insuring a large output from the kiln. The cooling of the charge may be increased by opening some of the plugs $c$ in the upper frame in order to let a portion of the air escape directly into the atmosphere, and thus regulate at will the quantity conveyed to the base of the tubes in order to burn therein the carbon monoxid.

In using the apparatus according to this invention the more or less rapid destruction of the metal tubes by the fire which might arise when the stoker is not sufficiently attentive is largely compensated for by the considerable saving of fuel. This injury to the tubes can, however, be easily avoided by judiciously regulating the draft, and, moreover, if injured the tubes can be easily repaired, it being possible to replace a tube without interfering with the working of the kiln.

This invention can be applied to furnaces such as ordinary blast-furnaces, as shown in Fig. 5, all that is necessary being to suspend in the furnace-top metal tubes 1 2, provided with collars 3, resting on the frame. The tubes 1 receive the charge without fuel and the others, 2, receive disintegrated carbon, which is converted into coke as it comes in contact with the hot sides of the tubes. The supporting-collars 3 are preferably arranged at about one meter from the upper part of the tubes, so as to leave between them and the upper collars 5 a closed space 4', into which enters the gas which is disengaged from the carbon inclosed in the tubes 2. This gas, rich in hydrocarbon, passes from the tubes 2 into the said space 4' through holes 6, arranged at the top of the tubes 2. It thence passes through conduits 7 to an annular collector 8, which directs it to an apparatus for reheating the air, or to boilers or gas-motors, for example. In order to avoid overheating of the tubes 1 and 2, I cause cold air to circulate around the system of tubes. This air may be supplied by a blast apparatus through an annular conduit 9 and enters between the tubes by openings 10 at their upper part. After having passed externally along the tubes 1 and 2 from top to bottom it enters by openings 12 in a very hot state the tubes containing the mineral, where it entirely burns the carbon-monoxid gas therein. The products of combustion rise in the said tubes and yield up their heat to the charge therein without the possibility of the carbon dioxid being transformed into carbon monoxid, as there is no fuel in the tubes 1.

The different phases of the operations are analogous to those of the apparatus hereinbefore described.

What I claim as my invention is—

The herein-described kiln or furnace provided with a refractory lining and with vertical flues located between said lining and the furnace-walls, said flues being in communication with the interior of the kiln or furnace above its grate-bars, and tubes suspended within the furnace or kiln and communicating therewith at their lower ends, as and for the purposes specified.

In testimony whereof I have hereunto set my hand in presence of two subscribing witnesses.

EMILE GOBBE.

Witnesses:
HENRY SCHWAB,
EMILE KLOBE.